US012515655B2

(12) United States Patent
Deniau et al.

(10) Patent No.: US 12,515,655 B2
(45) Date of Patent: Jan. 6, 2026

(54) REDUNDANT LANE MONITORING WITH FREQUENCY-BASED ANALYSIS OF DATA FROM MULTIPLE SENSORS

(71) Applicant: Continental Autonomous Mobility US, LLC, Auburn Hills, MI (US)

(72) Inventors: Jean-Christophe Deniau, Fenton, MI (US); Alia Jane Pierce, Rochester Hills, MI (US); Emma Kimmel, Oxford, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 188 days.

(21) Appl. No.: 18/195,105

(22) Filed: May 9, 2023

(65) Prior Publication Data
US 2024/0375649 A1 Nov. 14, 2024

(51) Int. Cl.
*B60W 30/12* (2020.01)
*B60W 40/06* (2012.01)
*B60W 60/00* (2020.01)

(52) U.S. Cl.
CPC ............ *B60W 30/12* (2013.01); *B60W 40/06* (2013.01); *B60W 60/00184* (2020.02)

(58) Field of Classification Search
CPC .................. B60W 30/12; B60W 40/06; B60W 60/00184; G08G 1/167; G08G 1/02
See application file for complete search history.

(56) References Cited

U.S. PATENT DOCUMENTS

| | | | |
|---|---|---|---|
| 6,014,595 A * | 1/2000 | Kobayashi | E01F 9/529 701/484 |
| 7,034,698 B2 | 4/2006 | Matsumoto et al. | |
| 7,102,539 B2 | 9/2006 | Kawazoe et al. | |
| 7,219,031 B2 | 5/2007 | Kawazoe et al. | |
| 7,603,215 B2 | 10/2009 | Matsumoto et al. | |
| 8,581,714 B2 | 11/2013 | Yu et al. | |
| 9,041,805 B2 | 5/2015 | Nakamura et al. | |
| 2005/0212666 A1* | 9/2005 | Kawazoe | G07C 5/085 340/436 |
| 2008/0243327 A1* | 10/2008 | Bujak | B60W 30/12 340/442 |
| 2008/0243337 A1 | 10/2008 | Tsuda | |

(Continued)

FOREIGN PATENT DOCUMENTS

EP        2076417 A1    7/2009

OTHER PUBLICATIONS

International Search Report and Written Opinion dated Aug. 16, 2024 from corresponding International patent application No. PCT/US2024/027715.

*Primary Examiner* — Toya Pettiegrew

(57) ABSTRACT

A system includes a computer having a processor and memory storing instructions executable by the processor. The instructions include instructions to receive roadway feedback data from a first vehicle sensor for a period of time and receive roadway feedback data from a second vehicle sensor for the period of time. The instructions include instructions to apply frequency-based analysis to both the roadway feedback data from the first vehicle sensor and the roadway feedback data from the second vehicle sensor for the period of time and identify travel of a wheel of the vehicle over rumble strips based on the frequency-based analysis.

23 Claims, 5 Drawing Sheets

(56) References Cited

U.S. PATENT DOCUMENTS

2011/0285518 A1* 11/2011 Gordon ................ B60W 40/06
                                                    73/146
2014/0249718 A1   9/2014  Liu et al.
2024/0308499 A1*  9/2024  Kobayashi ............ B60W 30/12

* cited by examiner

REDUNDANT LANE MONITORING WITH FREQUENCY-BASED ANALYSIS OF DATA FROM MULTIPLE SENSORS

BACKGROUND

Roadways include rumble strips on outer boundaries of lanes of the roadway. The rumble strips may be on the outside of the lane and/or may be at a dividing line between two lanes, e.g., between lanes of opposing traffic. The rumble strips vibrate the vehicle as one or more wheels of the vehicle travel over consecutive rumble strips to indicate to a vehicle and/or a human driver of vehicle that vehicle is straying from a lane. The rumble strips are spaced at consistent intervals and each have a common height. Accordingly, the vibration of the vehicle is periodic when one or more wheels of the vehicle trave over consecutive rumple strips.

Vehicles included lane-monitoring systems that monitor the position of the vehicle in the lane as the vehicle drives on a roadway. For example, the position of the vehicle in the lane may be identified with the use of object vision sensors, e.g., image sensors on the vehicle that repeatedly detect images of the roadway. The images can identify features of the roadway such as line markings, reflectors, and/or rumble strips and the position of the vehicle relative to those features. The vehicle may include a computer having image detection and image processing software to identify the position of the vehicle on the roadway.

Under certain circumstances, image detection of features of the roadway may be inhibited or prevented. As an example, snow, ice, or other covering on the roadway can interfere with or prevent image detection of line markings, reflectors, and/or rumble strips.

DETAILED DESCRIPTION

Figure 1A:
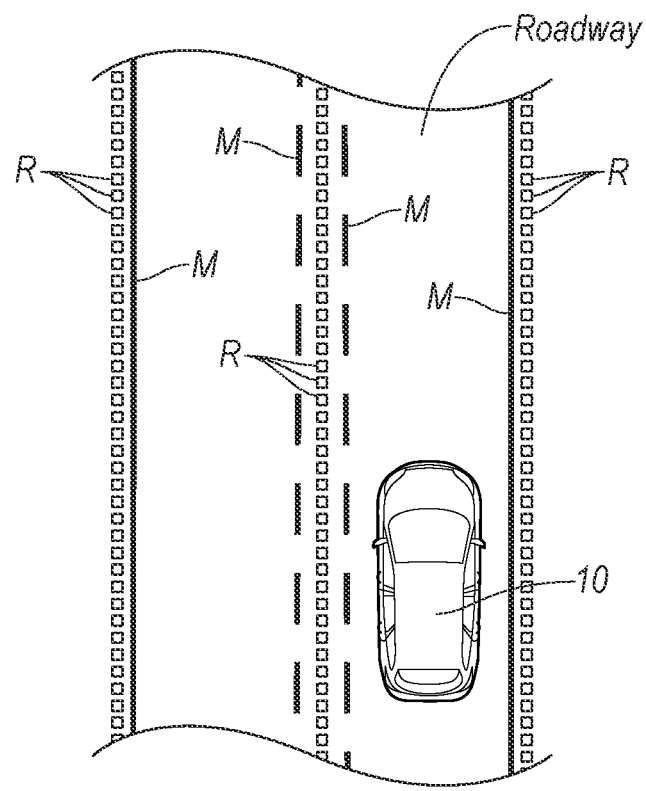
FIG. 1A is a plan view of a vehicle traveling on a roadway and positioned in a lane between rumble strips.

With reference to the Figures, wherein like numerals indicate like parts throughout the several views, a computer 12 has a processor and memory storing instructions executable by the processor. The instructions include instructions to receive roadway feedback data from a first vehicle sensor 14 for a period of time and receive roadway feedback data from a second vehicle sensor 14 for the period of time. The instructions include instructions to apply frequency-based analysis to both the roadway feedback data from the first vehicle sensor 14 and the roadway feedback data from the second vehicle sensor 14 for the period of time and identify travel of a wheel 20 of the vehicle 10 over rumble strips R based on the frequency-based analysis.

The computer 12 fuses roadway feedback data from at least two vehicle sensors 14, and more than two vehicle sensors 14 in some examples, to identify whether the wheel 20 of the vehicle 10 is traveling over rumble strips R. The computer 12 applies frequency-based analysis to detect periodic patterns in the physical input delivered from the roadway to the vehicle 10 resulting from the travel of the wheel 20 over the rumble strips R. Each of the vehicle sensors 14 detects input to the vehicle 10 from the roadway for operation of systems of the vehicle 10, e.g., steering system, ride and handling systems, wheel operation, etc., and secondarily the data from the vehicle sensors 14 also provide input to the computer 12 for detection of a periodic pattern indicating travel of the wheel 20 over rumble strips R. Specifically, the vehicle sensors 14 measure changes in roadway feedback. Roadway feedback data is a measurement of roadway feedback, i.e., physical input to the vehicle 10 resulting from travel of the vehicle 10 on the roadway. Specifically, uneven heights of the roadway, e.g., bumps, cracks, rocks, etc., result in force and vibration input from the roadway to the vehicle 10 through the wheels 20 of the vehicle 10. The roadway feedback includes changes in rotational speed of the wheel 20, changes in pressure in the tire 24 of the wheel 20, vibration of components of the vehicle 10, etc. Roadway feedback data that is not periodic appears as noise in the frequency-based analysis. Periodic input in the roadway feedback data resulting from travel of the wheel 20 over rumble strips R results in a signature in the frequency-based analysis identifying the travel of the wheel 20 over rumble strips R. For example, when the roadway feedback detected by the vehicle sensors 14 as roadway feedback data is transformed to the frequency domain, the periodic input of the rumble strips R results in a peak in the frequency domain. This peak indicates that the wheel 20 is traveling over the rumble strips R. The fusion of roadway feedback data from multiple vehicle sensors 14 and multiple types of vehicle sensors 14 increases the sensitivity and the accuracy of the signature in the frequency-based analysis that identifies travel of the wheel 20 over rumble strips R. This increase in sensitivity and accuracy may enhance detection of travel of the wheel 20 over rumble strips R when the rumble strips R are covered by snow, ice, etc., which is also a state in which detection of the rumble strips R by image detection is difficult or impossible.

Figure 1B:
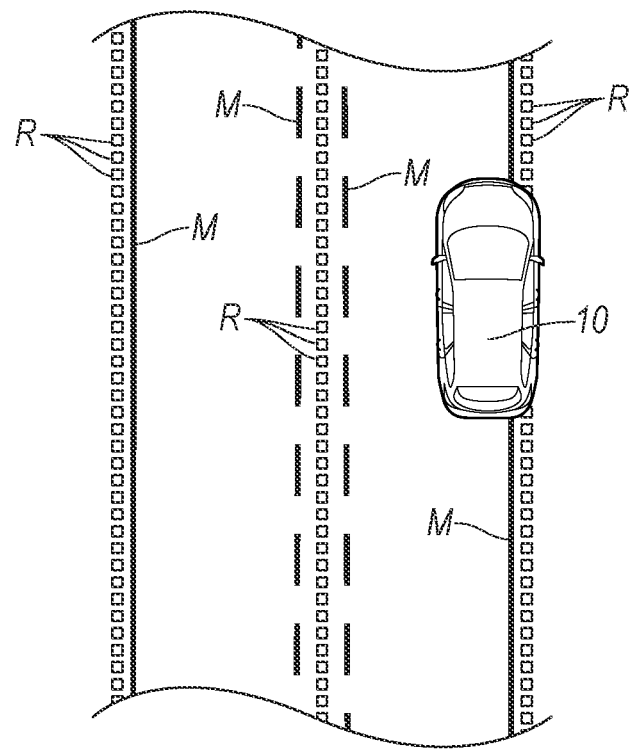
FIG. 1B is a plan view of a vehicle traveling over rumble strips.

The vehicle 10 may be any suitable type of automobile, e.g., a passenger or commercial automobile such as a sedan, a coupe, a truck, a sport utility vehicle, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input. FIGS. 1A-B show an example vehicle 10 on a roadway. The example vehicle 10 in FIG. 1A is in a lane between rows of rumble strips R outside of the lane. FIG. 1B shows the example vehicle 10 with wheels 20 of the vehicle 10 traveling over the rumble strips R.

Figure 4:
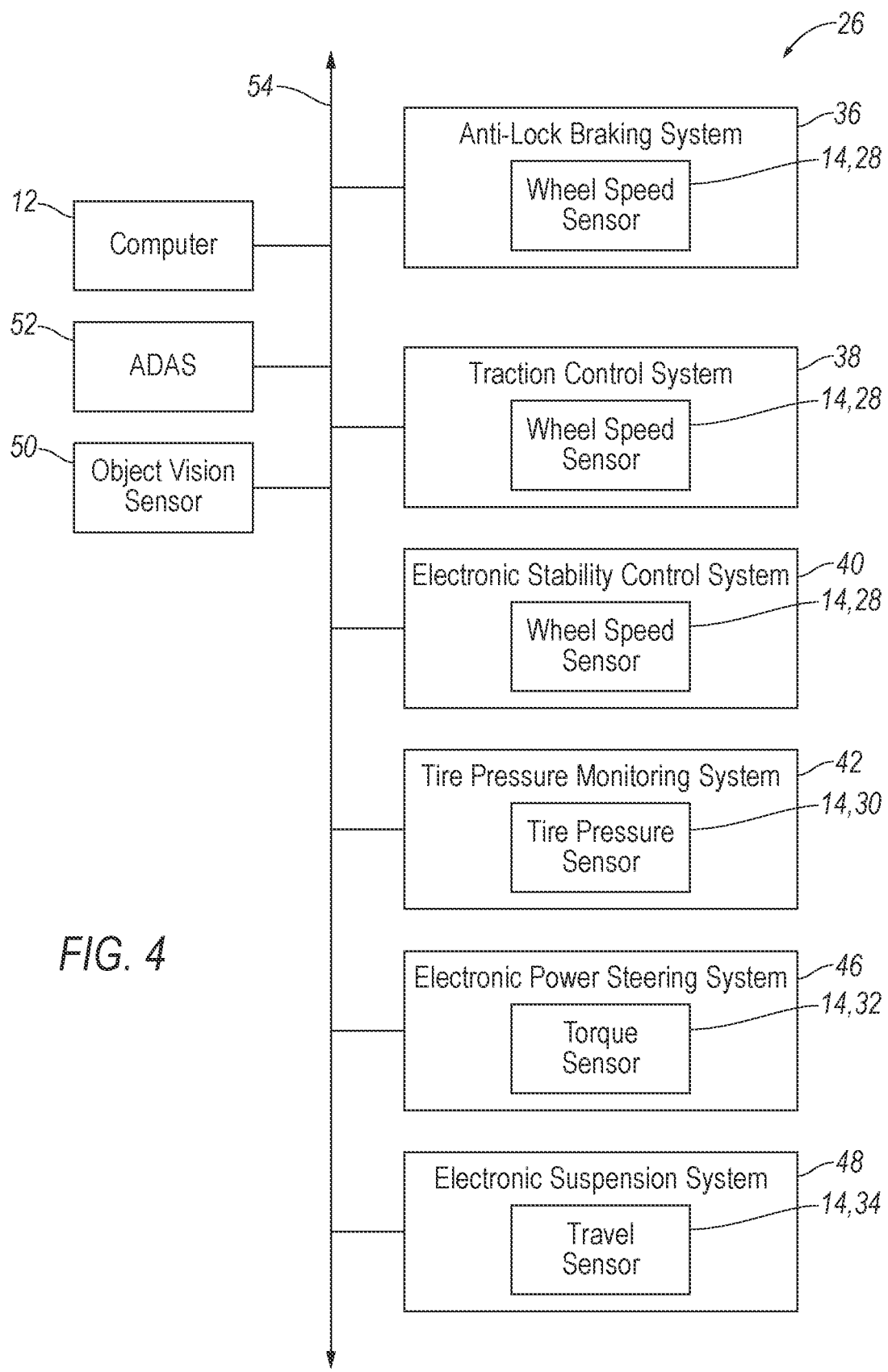
FIG. 4 is a block diagram of a system of the vehicle.

FIG. 4 a block diagram of an example system of the vehicle 10. The system 26 includes the computer 12 and a plurality of vehicle sensors 14. The vehicle 10 includes a plurality of vehicle systems, some or all of which may be known systems, such as a braking system, a propulsion system, a steering system, a suspension system, as well as other systems including but not limited to a body control system, a climate control system, a lighting system, and a human-machine interface (HMI) system, which may include an instrument panel and/or infotainment system, other systems described herein, etc. The vehicle 10 systems can each include one or more of the vehicle sensors 14, actuators, and other components.

With continued reference to FIG. 4, as set forth above, the vehicle 10 includes a plurality of sensors (including the vehicle sensors 14) that may be inside and/or outside of the vehicle 10 for sensing physical inputs. Specifically, the vehicle 10 includes at least two vehicle sensors 14. In the example shown in the FIG. 4, the vehicle 10 any one of the vehicle sensors 14 may be the first vehicle sensor 14 and any other of the vehicle sensors 14 may be the second vehicle sensor 14. The adjectives "first," "second," "third," etc., with reference to the vehicle sensor 14 are merely indicates and do not indicate order or importance. As described throughout, the system 26 may include more vehicle sensors 14 than those shown in FIG. 4. Each of the vehicle sensors 14 detects input to the vehicle 10 from the roadway for operation of vehicle 10 systems, e.g., steering system, braking system, suspension system, wheel systems, other systems described herein, etc. As set forth above, the vehicle sensors 14 may be components of the vehicle systems. In addition to detecting input for operation of the vehicle 10 systems, the vehicle sensors 14 provide input to the computer 12 for detection of a periodic pattern indicating travel of the wheel 20 over rumble strips R.

Specifically, the vehicle sensors 14 measure roadway feedback. Roadway feedback data is a measurement by the vehicle sensor 14 of physical input to the vehicle 10 resulting from travel of the vehicle 10 on the roadway. Specifically, uneven heights of the roadway, e.g., bumps, cracks, rocks, etc., result in force and vibration input from the roadway to the vehicle 10 through the wheels 20 of the vehicle 10. The roadway feedback includes changes in rotational speed of the wheel 20, changes in pressure in the tire 24, vibration of components of the vehicle 10, etc. As examples discussed below, the vehicle sensors 14 may include a wheel speed sensor 28, a tire pressure sensor 30, a torque sensor 32 of a vehicle-steering system, a travel sensor 34 of a vehicle 10 shock absorber, etc. In other examples, the vehicle sensors 14 may include any suitable type of vehicle sensor 14 that detects roadway feedback and communicates roadway feedback measurements in the form of roadway feedback data to the computer 12. The computer 12 uses roadway feedback data from at least two types of vehicle sensors 14 to identify travel of the wheel 20 over rumble strips R. Examples of these types are described herein, e.g., a wheel speed sensor 28, a tire pressure sensor 30, a torque sensor 32 of a vehicle-steering system, a travel sensor 34 of a vehicle 10 shock absorber, etc.

One of the vehicle sensors 14 may be, for example, a wheel speed sensor 28. The wheel speed sensor 28 measures the speed of the rotation of the wheel 20 of the vehicle 10. The wheel speed sensor 28 may be, for example, a component of an anti-lock braking system (ABS) 36 of the vehicle 10, a traction control system (TCS) 38 of the vehicle 10, and/or an electronic stability control (ESC) system 40 of the vehicle 10, including those currently known. The wheel speed sensor 28 may also be referred to as an ABS sensor. The vehicle 10 may include one wheel speed sensor 28 on each wheel 20 of the vehicle 10.

The wheel speed sensor 28 measures the rotational speed of the wheel 20. As an example, the wheel speed sensor 28 may be a magnetic field sensor that measures the rotational position and rotational speed of the wheel 20 by detecting relative movement of magnets driven by rotational of the wheel 20. As an example, the magnetic field sensor may be a solid-state magnetic field sensor using magnetoresistive (AMR) technology or giant magnetoresistive (GMR) technology. As another example, the magnetic field sensor may be a Hall-effect sensor. In the alternative to magnetic field sensor, the wheel speed sensor 28 may be of any type that measures the speed of the wheel 20 of the vehicle 10.

During travel of the vehicle 10 on a roadway, the rotational speed of the wheel 20 is slowed when the wheel 20 rolls over an irregularity on the roadway. Irregularities on the roadway may be, for example, bumps and cracks on the surface of the roadway, debris on the surface of the roadway such as gravel, etc. Similarly, the rotational speed of the wheel 20 is slowed each time the wheel 20 rolls over a rumble strip R. The change in rotational speed is roadway feedback to the vehicle 10. The wheel speed sensor 28 detects the change in rotational speed of the wheel 20 resulting from travel of the wheel 20 over irregularities on the roadway and rumble strips R as roadway feedback data and communicates the roadway feedback data to the computer 12. As described further below, the irregularities on the roadway are random so the roadway feedback data detected for the irregularities is random. The spacing and size of the rumble strips R are consistent so the roadway feedback data detected for the rumble strips R is periodic.

As another example, one of the vehicle sensors 14 may be, for example, a tire pressure sensor 30. The tire pressure sensor 30 measures the pressure in the inflation chamber of the tire 24 of the wheel 20 of the vehicle 10. Specifically, the wheel 20 includes a rim and a tire 24 on the rim and the inflation chamber is between the tire 24 and the rim, as is known. The tire pressure sensor 30 may be a component of a tire 24 pressure monitoring system (TPMS) 42 of the vehicle 10, including those currently known. The vehicle 10 may include one tire pressure sensor 30 on each wheel 20 of the vehicle 10.

The tire pressure sensor 30 may be, for example, in a valve of the tire 24 and/or a rim 44 of the wheel 20. In any event, the tire pressure sensor 30 is in communication with the inflation chamber of the tire 24 to measure the pressure of air in the inflation chamber.

During travel of the vehicle 10 on a roadway, the air pressure in the tire 24, i.e., tire 24 pressure, increases when the tire 24 rolls over an irregularity on the roadway or a rumble strip R. The change in tire 24 pressure is roadway feedback to the vehicle 10. The tire pressure sensor 30 detects the change in tire 24 pressure resulting from travel of the wheel 20 over irregularities on the roadway and rumble strips R as roadway feedback data and communicates the roadway feedback data to the computer 12.

As another example, one of the vehicle sensors 14 may be, for example, a torque sensor 32 that is a component of an electronic power steering (EPS) system 46 of the vehicle 10. The torque sensor 32 measures torque in the steering components road resistance experienced by the wheel 20 including road resistance caused by travel of the wheel 20 over irregularities on the roadway and rumble strips R. The torque sensor 32 may be, for example, attached to the steering linkage connected to the steering wheel 20 of the vehicle 10 in the interior of the vehicle 10. In such an example, the torque sensor 32 detects torque at the steering linkage. The torque sensor 32 may be a contact torque sensor 32 or a non-contact torque sensor 32. The EPS system 46 uses the measurement of torque, in part, to control steering of the vehicle 10.

During travel of the vehicle 10 on a roadway, road resistance from travel of the wheel 20 of the vehicle 10 over an irregularity on the roadway or a rumble strip R generates torque on the components of the steering system initially generated at the wheel 20 and this torque is transmitted through the mechanical components of the steering system (e.g., steering arms, linkages, rack-and-pinion, etc.). This torque is roadway feedback to the vehicle 10. The torque sensor 32 detects torque in one of the mechanical components of the steering system resulting from the road resistance as roadway feedback data and communicates the roadway feedback data to the computer 12.

As another example, one of the vehicle sensors 14 may be, for example, a sensor in a shock absorber of an electronic suspension system (ESS) 48. As an example, the vehicle sensor 14 may be a travel sensor 34 of the shock absorber. Specifically, the shock absorber is between the wheel 20 and the vehicle 10 body. The shock absorber includes a tube, a rod, and working fluid therebetween, as is known. The rod moves into and out of the tube in response to movement of the vehicle 10 on uneven surfaces of the roadway and the working fluid dampens movement of the rod relative to the tube. The travel sensor 34 of the shock absorber detects the travel of the rod relative to the tube during travel of the wheel 20 on the road surface. The data from the travel sensor 34 is used by the ESS 48 to control valves, dampers, etc., of the shock absorber and/or to control other ride and handling components of the vehicle 10.

During travel of the vehicle 10 on a roadway, travel of the wheel 20 of the vehicle 10 over an irregularity on the roadway or a rumble strip R bounces the wheel 20 upwardly, which causes the rod of the shock absorber to plunge into the tube. This relative movement between the rod and the tube is roadway feedback to the vehicle 10. The travel sensor 34 of the shock absorber detects the movement of the rod relative to the tube as roadway feedback data and communicates the roadway feedback data to the computer 12.

In other examples, the vehicle sensors 14 may be of any type that detect any type of roadway feedback including vibration, sound, force, etc., generated from travel of the wheel 20 of the vehicle 10 over rumble strips R and communicatees the detection of the roadway feedback as roadway feedback data to the computer 12. The computer 12 uses the roadway feedback data from more than one type of vehicle sensor 14.

The vehicle 10 includes an object vision sensor 50 that detects the roadway and objects on the roadway. Object vision sensors 50 may include a variety of devices such as are known to provide vision data of the surroundings of the vehicle 10 to the computer 12. For example, the object vision sensor 50 may include image sensors such as camera vehicle sensors 14, e.g. front view, side view, etc., providing images from an area surrounding the vehicle 10. The image sensors may be, for example, CCD image sensors, CMOS image sensors, etc. As another example, the object vision sensors 50 may include Light Detection And Ranging (LiDAR) sensors that may be disposed on a top of the vehicle 10, behind a vehicle 10 front windshield, around the vehicle 10, etc., that provide relative range, sizes, and shapes of objects surrounding the vehicle 10. As another example, the object vision sensors 50 may include one or more radar vehicle sensors 14. The radar sensors may be fixed to vehicle 10 bumpers may provide data to provide locations of the objects relative to the location of the vehicle 10. In the context of this disclosure, an object is a physical, i.e., material, item that can be detected by physical phenomena (e.g., light or other electromagnetic waves, or sound, etc.) detectable by object vision sensors 50.

The object vision sensor 50 detects objects surrounding the vehicle 10 including the roadway (and including rumble strips R, painted lane markers M, reflectors, etc., on the roadway). Specifically, the object vision sensor 50 is positioned to detect objects, e.g., images, LiDAR data, radar data, etc., of a roadway including rumble strips R. The object vision sensor 50 is in communication with the computer 12 to communicate object data to the computer 12 and the computer 12 determines the position of the vehicle 10 relative to the objects. As an example, the computer 12 may identify the position of the vehicle 10 relative to the rumble strips R based on detection of the rumble strips R by the object vision sensor 50. The computer 12 may have image detection and image processing software to identify the position of the vehicle 10 on the roadway.

With continued reference to FIG. 3, the vehicle 10 may include an advanced driver-assistance system (ADAS) 52. The ADAS 52 may operate the vehicle 10 in an autonomous, a semi-autonomous mode, or a non-autonomous (manual) mode, i.e., can control and/or monitor operation of the vehicle 10, including controlling and/or monitoring components. For purposes of this disclosure, an autonomous mode is defined as one in which each of vehicle 10 propulsion, braking, and steering are controlled by the ADAS 52; in a semi-autonomous mode the ADAS 52 controls one or two of vehicle 10 propulsion, braking, and steering; in a non-autonomous mode a human operator controls each of vehicle 10 propulsion, braking, and steering. One or more ADAS 52 computers may include programming to operate one or more of vehicle brakes, propulsion (e.g., control of acceleration in the vehicle 10 by controlling one or more of an internal combustion engine, electric motor, hybrid engine, etc.), steering, climate control, interior and/or exterior lights, etc.

With continued reference to FIG. 4, the computer 12 may be a microprocessor-based controller or field programmable gate array (FPGA), or a combination of both, implemented via circuits, chips, and/or other electronic components. In other words, the computer 12 is a physical, i.e., structural, component of the system. The computer 12 may include a processor, memory, etc. The memory of the computer 12 may store instructions executable by the processor, i.e., processor-executable instructions, and/or may store data. The controller may be in communication with a vehicle network 54 of the vehicle to send and/or receive instructions from the vehicle 10, e.g., components of the ADAS 52. The memory includes one or more forms of computer-readable media, and stores instructions executable by the processor for performing various operations, including as disclosed herein. The memory stores instructions executable by the processor for performing the example process flow 400, as described below. Specifically, the computer 12 receives input from multiple vehicle sensors 14, based on such input, monitors for travel of one or more tire 24s of the vehicle 10 over rumble strips R. Use herein (including with reference to the method 400 in the figures) of "based on," "in response to," and "upon determining," indicates a causal relationship, not merely a temporal relationship.

The processor can be implemented using any suitable processor or logic device, such as a complex instruction set computer 12 (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). The processor also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, computer 12 can include multiple processors, each one of which can be implemented according to any of the examples above.

The computer 12 may be an ECU (which can also be referred to as electronic control modules (ECMs) or simply as "control modules"). An ECU is a computer that monitors and/or controls various components of vehicle 10, e.g., vehicle sensors 14. Examples of ECUs of the vehicle 10 can include an engine control module, a transmission control module, a powertrain control module, a brake control module, a steering control module, and so forth. Any given ECU of the vehicle 10 can include a processor and a memory. The memory can include one or more forms of memory and can store instructions executable by the processor for performing various operations, including as disclosed herein. The processor of any given ECU can be implemented using a general-purpose processor or a dedicated processor or processing circuitry, including any of the examples identified above in reference to a processor included in the computer 12.

In some implementations, the processor of a given ECU can be implemented using a microcontroller. In some implementations, the processor of a given ECU can be implemented using a dedicated electronic circuit including an ASIC that is manufactured for a particular operation, e.g., an ASIC for processing sensor data and/or communicating the sensor data. In some implementations, the processor of a given ECU can be implemented using an FPGA, which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of general-purpose processor(s), ASIC(s), and/or FPGA circuits may be included in a given ECU.

The vehicle network 54 is a network via which messages can be exchanged between various devices in vehicle 10. Computer 12 can be generally programmed to send and/or receive, via vehicle network 54, messages to and/or from other devices in vehicle 10 (e.g., any or all of ECUs and vehicle sensors 14. Additionally or alternatively, messages can be exchanged among various such other devices in vehicle 10 via vehicle network 54. Various controllers and/or vehicle sensors 14 may provide data to the computer 12.

In some implementations, vehicle network 54 can be a network in which messages are conveyed via a vehicle communications bus. For example, vehicle network 54 can include a controller area network (CAN) in which messages are conveyed via a CAN bus, or a local interconnect network (LIN) in which messages are conveyed via a LIN bus.

In some implementations, vehicle network 54 can include a network in which messages are conveyed using other wired communication technologies and/or wireless communication technologies (e.g., Ethernet, WiFi, Bluetooth, etc.). Additional examples of protocols that may be used for communications over vehicle 10 network in some implementations include, without limitation, Media Oriented System Transport (MOST), Time-Triggered Protocol (TTP), and FlexRay.

In some implementations, vehicle network 54 can represent a combination of multiple networks, possibly of different types, that support communications among devices in vehicle 10. For example, vehicle network 54 can include a CAN in which some devices in the vehicle 10 communicate via a CAN bus, and a wired or wireless local area network in which some device in vehicle 10 communicate according to Ethernet or Wi-Fi communication protocols.

Figure 5:
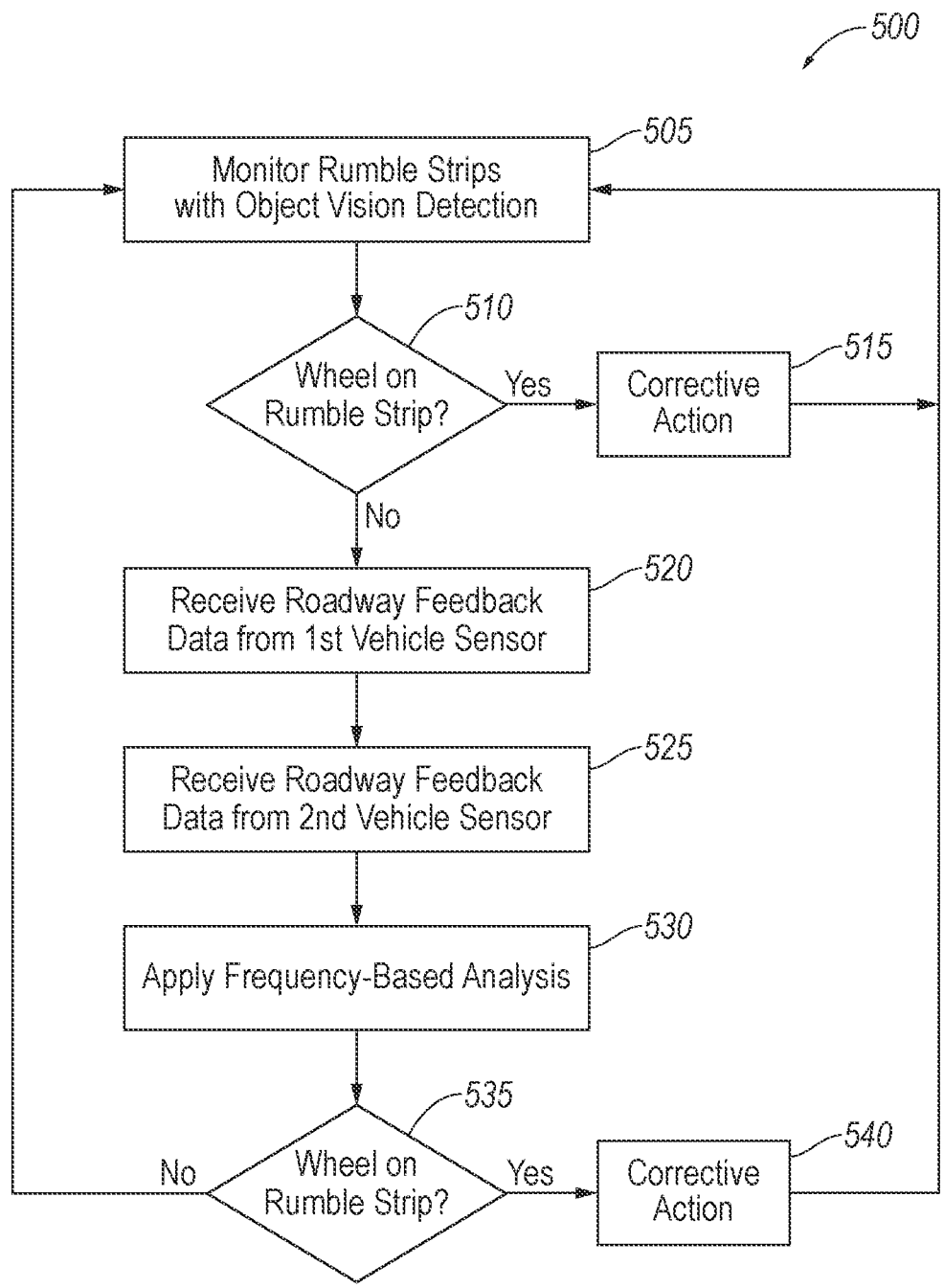
FIG. 5 is an example process.

An example process 500 performed by the computer 12 is shown in FIG. 5. With reference to block 505, the process 500 includes monitoring the position of the vehicle 10 relative to rumble strips R with object vision detection. With reference to block 510, the object vision sensor 50 and/or the computer 12 based on data from the object vision sensor 50 identifies vehicle 10 position, and specifically position of the wheel 20 of the vehicle 10, relative to rumble strips R on the roadway based on object vision detection by the object vision sensor 50. As set forth above, the object vision sensor 50 may be an image sensor in which case the image sensor repeatedly captures image data of the surroundings of the vehicle 10 including the roadway and the rumble strips R on the roadway. In such examples, the computer 12 may have image detection and image processing software to identify the position of the vehicle 10 on the roadway and the position of the vehicle 10 relative to the rumble strips R. In other examples, the position of the vehicle 10 relative to the rumble strips R may be based on LiDAR data from a LiDAR sensor, radar data from a radar sensor, etc.

With reference to block 515, the process 500 includes corrective action in the event that the object vision sensor 50 and/or the computer 12 identify that the wheel 20 of the vehicle 10 is traveling on the rumble strip R. As an example, in response to the identification that the wheel 20 of the vehicle 10 is traveling on the rumble strip R, the computer 12 may command a warning to the driver of the vehicle 10. The warning may be a physical warning such as an audible warning, visual warning, and/or haptic warning indicating to the driver that the wheel 20 of the vehicle 10 is traveling on the rumble strip R. As another example, the computer 12 may command a system of the vehicle 10 (e.g., the ADAS 52, steering system, and/or braking system, etc.) to steer the travel of the vehicle 10 away from the rumble strips R.

The process 500 includes redundant lane monitoring to the lane monitoring conducted in blocks 505-515 based on object vision detection. The redundant lane monitoring includes fusion of roadway feedback data from at least two types of vehicle sensors 14. As set forth above, the vehicle sensors 14 may be components of other systems of the vehicle 10. As set forth above, the vehicle sensors 14, for example, may be a wheel speed sensor 28, a tire pressure sensor 30, a torque sensor 32 of a steering system, a travel sensor 34 of a vehicle 10 shock absorber, etc.

In blocks 520 and 525, the process 500 includes receiving roadway feedback data from at least two vehicle sensors 14 for a common period of time. As an example, blocks 520 and 525 include receiving roadway feedback data from two vehicle sensors 14 and, as set forth above, the process 500 may similarly include receiving roadway feedback data from more than two vehicle sensors 14, e.g., a third vehicle sensor 14, fourth vehicle sensor 14, and so on. In such examples, the application of frequency-based analysis in blocks 530 and 535, described below, includes the roadway feedback data from all of the vehicle sensors 14. Whether based on two or more vehicle sensors 14, at least two of the vehicle sensors 14 included in blocks 520-535 are different types of vehicle sensors 14. Specifically, in some examples the first vehicle sensor 14 is one of a wheel speed sensor 28, a tire pressure sensor 30, a torque sensor 32 of a steering system, a travel sensor 34 of a vehicle 10 shock absorber, etc., and the second vehicle sensor 14 is another one of a wheel speed sensor 28, a tire pressure sensor 30, a torque sensor 32 of a steering system, a travel sensor 34 of a vehicle 10 shock absorber, etc.

As set forth above, in blocks 520 and 525, the roadway feedback data is collected by the vehicle sensors 14 for a common period of time. Thus, the roadway feedback data may be fused for frequency-based analysis as described further below. As shown in the feedback loops in process 500, blocks 520 and 525 are simultaneously repeated for subsequent time periods.

With reference to block 530, the process 500 includes applying frequency-based analysis to both the roadway feedback data from the first vehicle sensor 14 and the roadway feedback data from the second vehicle sensor 14 for the period of time. The frequency-based analysis transforms the roadway feedback data from the vehicle sensors 14 from the time domain to the frequency domain for the roadway feedback data from the common period of time.

Figure 3A:
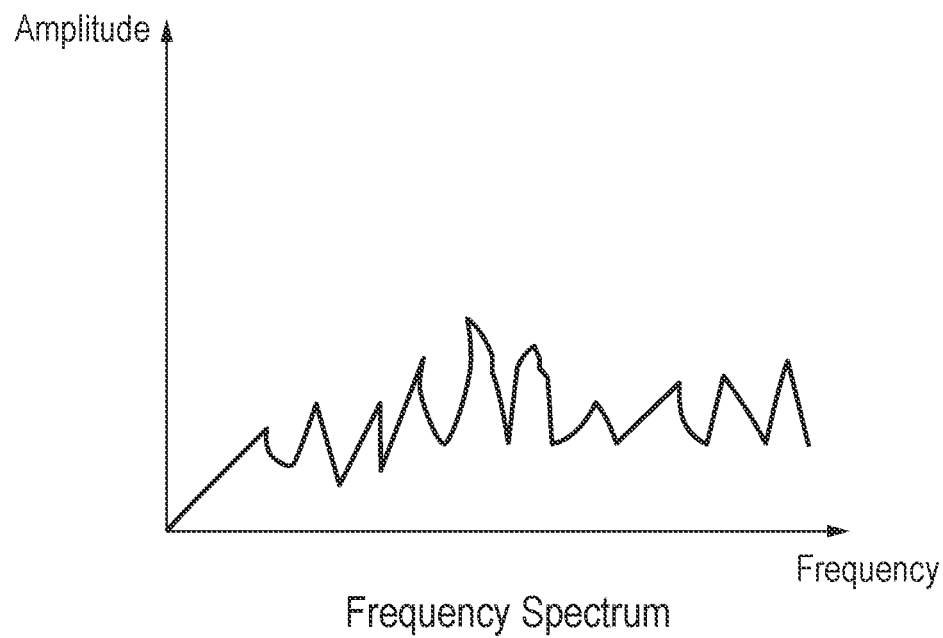
FIG. 3A is a hypothetical example of roadway feedback data transformed into a frequency domain from the vehicle in FIG. 1A.
Figure 3B:
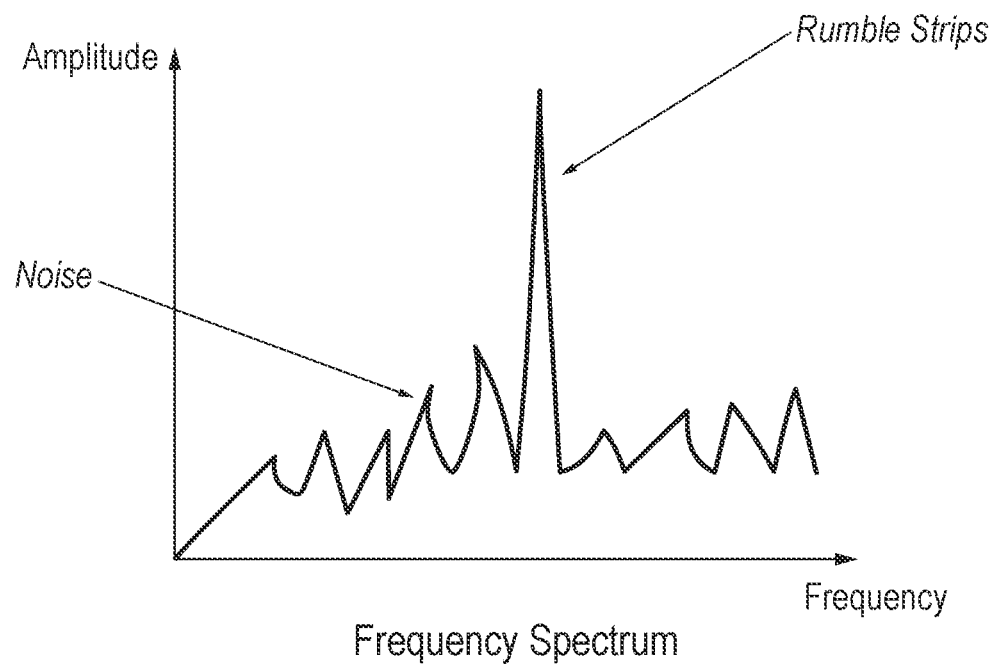
FIG. 3B is a hypothetical example of roadway feedback data transformed into a frequency domain from the vehicle in FIG. 1B while the vehicle travels over rumble strips.

Data in the frequency domain indicates periodic input. As set forth above, the roadway feedback from travel of the wheel 20 of the vehicle 10 over the rumble strips R is periodic. Specifically, FIGS. 3A and 3B are hypothetical examples of roadway feedback data from vehicle sensors 14 that has been transformed from the time domain to the frequency domain. FIG. 3A is a hypothetical example of roadway feedback data in the frequency domain during travel of the vehicle 10 in FIG. 1A, i.e., without the wheel 20 travelling on the rumble strips R. The peaks and valleys in FIG. 1A result from travel of the wheels 20 of the vehicle 10 over random irregularities in the road such as cracks, bumps, gravel, etc. Since the irregularities are random, the data in FIG. 1A does not include a large peak and instead includes random peaks and valleys of generally the same amplitude.

Figure 2:
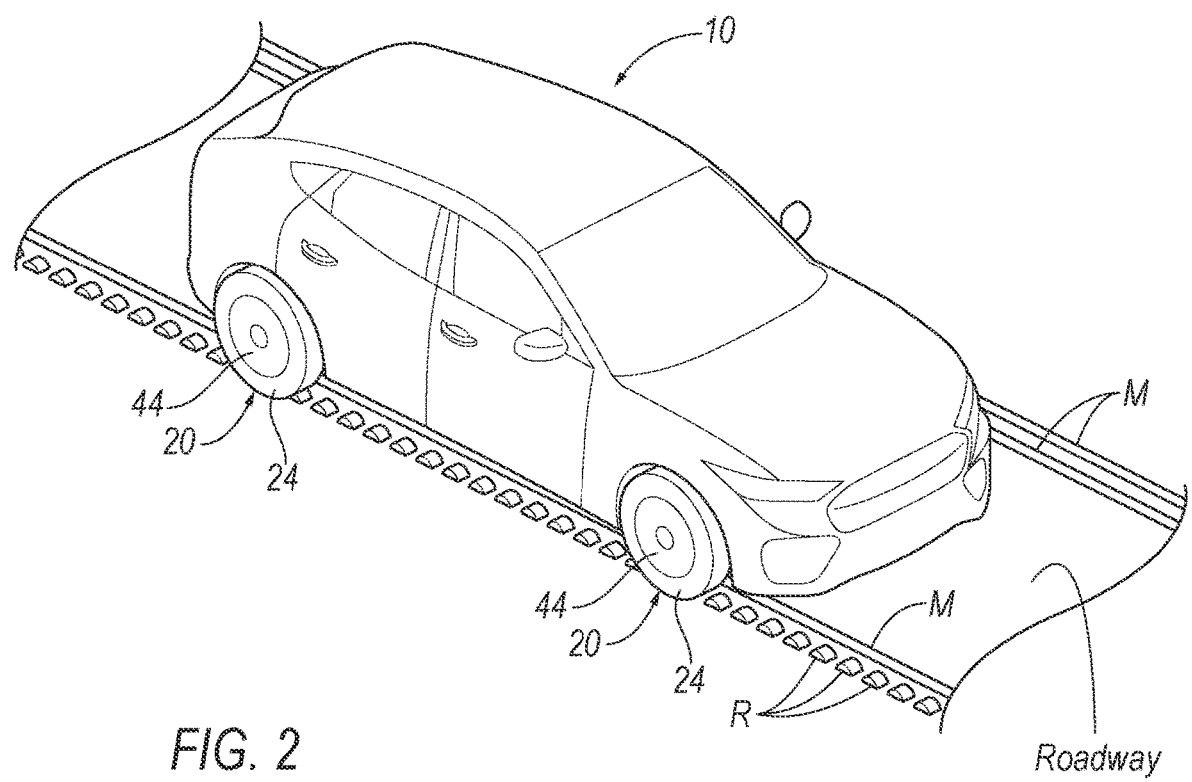
FIG. 2 is a perspective view of a vehicle traveling over rumble strips.

FIG. 3B is a hypothetical example, of roadway feedback data in the frequency domain during travel of the vehicle 10 in FIGS. 1B and 2, i.e., while the wheel 20 of the vehicle 10 travels over rumble strips R. Since the spacing and size of the rumble strips R are consistent, the roadway feedback is from the rumble strips R is periodic and the roadway feedback data, when transformed to the frequency domain, appears as a peak having a higher amplitude than the rest of the data from the time period being considered. The peak of high amplitude in FIG. 3A from periodic input in the roadway feedback data from travel of the tire 24 over rumble strips R is a signature of travel of the tire 24 over rumble strips R. The roadway feedback data that is not periodic, i.e., from roadway feedback other than travel of the wheel 20 over the rumble strips R, appears as noise, i.e., peaks of smaller amplitude, in FIG. 3B.

As one example, the frequency-based analysis includes applying a fast Fourier transform to the roadway feedback data from the first vehicle sensor 14 and the second vehicle sensor 14 (and additional vehicle sensors 14 in such examples). The fast Fourier transform transforms the roadway feedback data from the period of time being considered from the time domain to the frequency domain.

With reference to block 535, the process 500 includes identifying travel of a wheel 20 of the vehicle 10 over rumble strips R on the roadway based on the frequency-based analysis. For example, when the roadway feedback data is transformed from the time domain to the frequency domain, e.g., by application of a fast Fourier transform, the identification of travel of a wheel 20 of the vehicle 10 over rumble strips R includes identifying a peak in the spectrum of frequencies of the frequency domain indicating travel of the tire 24 of the vehicle 10 over the rumble strips R. In other words, the process 500 includes identifying the signature of the travel of the tire 24 of the vehicle 10 over the rumble strips R, as described above. The computer 12 may be programmed to analyze the transformed roadway feedback data in the frequency domain to identify the peak associated with travel of the tire 24 of the vehicle 10 over the rumble strips R.

As set forth above, the process 500 fuses vehicle 10 feedback data from at least two vehicle sensors 14. The fusion of roadway feedback data may be before or after the transformation from the time domain to the frequency domain, e.g., before or after the application of a fast Fourier transform. As one example, blocks 530 and 535 include transforming the roadway feedback data from the first vehicle sensor 14 for a period of time into a frequency domain and transforming the roadway feedback data from the second vehicle sensor 14 for the same period of time into the frequency domain.

As one example, the frequency-based analysis includes transforming the roadway feedback data from the first vehicle sensor 14 for the period of time into a first data set in the frequency domain and, separately, transforming the roadway feedback data from the second vehicle sensor 14 for the same period of time into a second data set in the frequency domain. In such an example, identification of travel of a wheel 20 of the vehicle 10 over rumble strips R includes identifying a peak of high amplitude in the spectrum of frequencies of the first data set indicating travel of the tire 24 of the vehicle 10 over the rumble strips R and identifying a peak of high amplitude in the spectrum of the second data set indicating travel of the tire 24 of the vehicle 10 over the rumble strips R. In such an example, the identification of the peak of high amplitude in at least one of the first data set and the second data set indicates a probability of identification of travel of the tire 24 over rumble strips R and identifications of a similar peak of high amplitude in the second data set (and potentially peaks in data sets from additional vehicle sensors 14) increases the probability of travel of the tire 24 over rumble.

As another example, the frequency-based analysis includes transforming the roadway feedback data from the first vehicle sensor 14 for a period of time and the roadway feedback data from the second vehicle sensor 14 for the same period of time into one data set in the frequency domain. In such an example, the identification of a peak of high amplitude in the spectrum of frequencies of the frequency domain indicates travel of the wheel 20 of the vehicle 10 over the rumble strips R.

The fusion of roadway feedback data from multiple vehicle sensors 14, whether in separate data sets or one combined data set, increases the sensitivity and the accuracy of the signature in the frequency-based analysis that identifies travel of the tire 24 over rumble strips R. This increase in sensitivity and accuracy may enhance detection of travel of the tire 24 over rumble strips R when the rumble strips R are covered by snow, ice, etc., which is also a state in which detection of the rumble strips R by image detection is difficult or impossible. As shown in block 540, the process 500 includes corrective action, which can be the same type of corrective action discussed above with reference to block 515.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method of monitoring for vehicle travel over rumble strips, the method comprising:
receiving roadway feedback data from a first vehicle sensor for a period of time from a first vehicle system;
receiving roadway feedback data from a second vehicle sensor for the period of time from a second vehicle system, wherein the first vehicle system is different than the second vehicle system and the second vehicle sensor measures a different physical input to the vehicle than is measured by the first vehicle sensor;
applying frequency-based analysis to both the roadway feedback data from the first vehicle sensor and the roadway feedback data from the second vehicle sensor for the period of time;
identifying travel of a wheel of the vehicle over rumble strips based on the frequency-based analysis; and
autonomously commanding operation of a vehicle system as a corrective action in response to the identified operation of the wheel of the vehicle traveling over the rumble strips.

2. The method as set forth in claim 1, wherein the frequency-based analysis includes applying a fast Fourier transform to transform the roadway feedback data from the first vehicle sensor for the period of time and the roadway feedback data from the second vehicle sensor for the period of time into the frequency domain.

3. The method as set forth in claim 1, wherein identifying travel of the wheel of the vehicle over rumble strips includes:
transforming the roadway feedback data from the first vehicle sensor for the period of time and the roadway feedback data from the second vehicle sensor for the period of time into the frequency domain; and
identifying a peak in the spectrum of frequencies of the frequency domain indicating travel of the wheel of the vehicle over the rumble strips.

4. The method as set forth in claim 1, wherein the frequency-based analysis includes:
transforming the roadway feedback data from the first vehicle sensor for the period of time into a first data set in the frequency domain;
transforming the roadway feedback data from the second vehicle sensor for the period of time into a second data set in the frequency domain; and
identifying a peak in the spectrum of frequencies of the first data set and the second data set indicating travel of the wheel of the vehicle over the rumble strips.

5. The method as set forth in claim 1, wherein the frequency-based analysis includes:
transforming the roadway feedback data from the first vehicle sensor for the period of time and the roadway feedback data from the second vehicle sensor for the period of time into one data set in the frequency domain; and
identifying a peak in the spectrum of frequencies of the frequency domain indicating travel of the wheel of the vehicle over the rumble strips.

6. The method as set forth in claim 1, wherein the first vehicle sensor is one of and the second vehicle sensor is another one of: a wheel speed sensor, a tire pressure sensor, a torque sensor of a vehicle-steering system, and a travel sensor of a vehicle shock absorber.

7. The method as set forth in claim 1, further comprising identifying vehicle position relative to rumble strips based on object vision detection by an object vision sensor.

8. The method as set forth in claim 1, further comprising receiving roadway feedback data from a third vehicle sensor for the period of time and applying the frequency-based analysis to the roadway feedback data from the third vehicle sensor.

9. A computer having a processor and memory storing instructions executable by the processor to:
receive roadway feedback data from a first vehicle sensor for a period of time from a first vehicle system;
receive roadway feedback data from a second vehicle sensor for the period of time from a second vehicle system, wherein the second vehicle system is different than the first vehicle system and the second vehicle sensor measures a different physical input to the vehicle than is measured by the first vehicle sensor;
apply frequency-based analysis to both the roadway feedback data from the first vehicle sensor and the roadway feedback data from the second vehicle sensor for the period of time;
identify travel of a wheel of the vehicle over rumble strips based on the frequency-based analysis; and
autonomously command a vehicle operation in response to identifying of the wheel of the vehicle traveling over the rumble strips.

10. The computer as set forth in claim 9, wherein the instructions to apply frequency-based analysis includes instructions to apply a fast Fourier transform to transform the roadway feedback data from the first vehicle sensor for the period of time and the roadway feedback data from the second vehicle sensor for the period of time into the frequency domain.

11. The computer as set forth in claim 9, wherein instructions to identify travel of the wheel of the vehicle over rumble strips includes instructions to:
transform the roadway feedback data from the first vehicle sensor for the period of time and the roadway feedback data from the second vehicle sensor for the period of time into the frequency domain; and
identify a peak in the spectrum of frequencies of the frequency domain indicating travel of the wheel of the vehicle over the rumble strips.

12. The computer as set forth in claim 9, wherein the instructions to apply frequency-based analysis includes instructions to:
transform the roadway feedback data from the first vehicle sensor for the period of time into a first data set in the frequency domain;
transform the roadway feedback data from the second vehicle sensor for the period of time into a second data set in the frequency domain; and
identify a peak in the spectrum of frequencies of the first data set and the second data set indicating travel of the wheel of the vehicle over the rumble strips.

13. The computer as set forth in claim 9, wherein the instructions to apply the frequency-based analysis includes instructions to:
transform of the roadway feedback data from the first vehicle sensor for the period of time and the roadway feedback data from the second vehicle sensor for the period of time into one data set in the frequency domain; and identify a peak in the spectrum of frequencies of the frequency domain indicating travel of the wheel of the vehicle over the rumble strips.

14. The computer as set forth in claim 9, wherein the first vehicle sensor is one of and the second vehicle sensor is another one of: a wheel speed sensor, a tire pressure sensor, a torque sensor of a vehicle-steering system, and a travel sensor of a vehicle shock absorber.

15. The computer as set forth in claim 9, wherein the instructions include instructions to identify vehicle position relative to rumble strips based on images detected by an image sensor.

16. The method as set forth in claim 1, wherein the instructions include instructions to receive roadway feedback data from a third vehicle sensor for the period of time and apply the frequency-based analysis to the roadway feedback data from the third vehicle sensor.

17. A system comprising:
a first vehicle sensor;
a second vehicle sensor; and
computer having a processor and memory storing instructions executable by the processor to:
receive roadway feedback data from the first vehicle sensor for a period of time from a first vehicle system;
receive roadway feedback data from the second vehicle sensor for the period of time from a second vehicle system that is different than the first vehicle system and the second vehicle sensor measures a different physical input to the vehicle than is measured by the first vehicle sensor;
apply frequency-based analysis to both the roadway feedback data from the first vehicle sensor and the roadway feedback data from the second vehicle sensor for the period of time;
identify travel of a wheel of the vehicle over rumble strips on the roadway based on the frequency-based analysis; and
to command operation of at least one vehicle system in response to the identified operation of the wheel of the vehicle traveling over the rumble strips.

18. The system as set forth in claim 17, further comprising an object vision sensor positioned to detect objects of a roadway and wherein the memory stores instructions including instructions to identify vehicle position relative to rumble strips on the roadway based on the object vision detection of the object vision sensor.

19. The system as set forth in claim 17, further comprising a LiDAR sensor positioned to detect light reflected by a roadway and wherein the instructions include instructions to identify vehicle position relative to rumble strips on the roadway based on light detection by the LiDAR sensor.

20. The system as set forth in claim 17, further comprising a third vehicle sensor and wherein the instructions include instructions to receive roadway feedback data from the third vehicle sensor for the period of time and apply the frequency-based analysis to the roadway feedback data from the third vehicle sensor.

21. The system as set forth in claim 17, wherein the instructions to apply frequency-based analysis includes instructions to:
transform the roadway feedback data from the first vehicle sensor for the period of time into a first data set in the frequency domain;
transform the roadway feedback data from the second vehicle sensor for the period of time into a second data set in the frequency domain; and
identify a peak in the spectrum of frequencies of the first data set and the second data set indicating travel of the wheel of the vehicle over the rumble strips.

22. The system as set forth in claim 17, wherein the instructions to apply the frequency-based analysis includes instructions to:
transform of the roadway feedback data from the first vehicle sensor for the period of time and the roadway feedback data from the second vehicle sensor for the period of time into one data set in the frequency domain; and
identify a peak in the spectrum of frequencies of the frequency domain indicating travel of the wheel of the vehicle over the rumble strips.

23. The system as set forth in claim 17, wherein the first vehicle sensor is one of and the second vehicle sensor is another one of: a wheel speed sensor, a tire pressure sensor, a torque sensor of a vehicle-steering system, and a travel sensor of a vehicle shock absorber.

* * * * *